United States Patent [19]

Favstritsky et al.

[11] Patent Number: 4,831,072
[45] Date of Patent: May 16, 1989

[54] FLAME RETARDANT MPPE RESIN COMPOSITIONS

[75] Inventors: Nicolai A. Favstritsky; Robert J. Nulph, both of Lafayette; Dennis M. Borden, West Lafayette, all of Ind.

[73] Assignee: Great Lakes Chemical Corporation, West Lafayette, Ind.

[21] Appl. No.: 107,228

[22] Filed: Oct. 9, 1987

[51] Int. Cl.$^4$ ............................ C08K 5/03; C08K 3/22
[52] U.S. Cl. .................................. 524/412; 524/466; 524/469; 524/508; 524/540
[58] Field of Search ............... 524/469, 466, 540, 501, 524/412

[56] References Cited

U.S. PATENT DOCUMENTS

| | | | |
|---|---|---|---|
| 3,457,204 | 7/1969 | Burger et al. | 260/2.5 |
| 3,817,912 | 6/1974 | Diebel et al. | 260/45.7 R |
| 3,920,606 | 11/1975 | Diebel et al. | 260/45.7 R |
| 4,129,551 | 12/1978 | Rueter et al. | 524/139 |
| 4,154,712 | 5/1979 | Lee | 524/469 |
| 4,172,826 | 10/1979 | Haaf et al. | 524/508 |
| 4,355,126 | 10/1982 | Haaf et al. | 524/469 |
| 4,388,429 | 6/1983 | Ilardo et al. | 524/94 |
| 4,456,720 | 6/1984 | Abolins et al. | 524/469 |

FOREIGN PATENT DOCUMENTS 1121736 7/1968 United Kingdom ............... 524/469

*Primary Examiner*—Lewis T. Jacobs
*Attorney, Agent, or Firm*—Kirkland & Ellis

[57] ABSTRACT

Flame retardant MPPE compositions incorporate an effective amount of a polybrominated higher alkylbenzene or mixture thereof as a flame retardant and flow modifier together with an enhancing agent.

8 Claims, No Drawings

FLAME RETARDANT MPPE RESIN COMPOSITIONS

BACKGROUND OF THE INVENTION

1. Field of the Invention

This invention relates to modified polyphenylene ether resins having improved flow properties and, in particular, it relates to modified polyphenylene ether resins incorporating a polybrominated higher alkylbenzene and a flame retardant enhancer such as antimony trioxide.

2. Description of the Prior Art

Traditionally, most flame retardants, although efficient in their function of retarding the rate of combustion in a resin system, have a tendency to affect adversely one or more key properties of the resin. For example, many flame retardant additives tend to reduce impact strength of the resin; to migrate from the resin composition, resulting in a phenomena known as "bloom"; to volatilize from the resin composition; to plasticize the resin composition adversely, thus lowering the heat deflection temperature, etc.

It is therefore essential that flame retardant agents be specifically tailored to the resin system so that, in addition to its role as a flame retardant, the agent will additionally enhance the desirable characteristics of the resin composition. Those skilled in the art well known that the selection of such an application-specific flame retardant is unpredictable at best. Thus, even through a given agent may exhibit utility in a particular resin system, that is no guarantee that this agent will have any use at all with other resins.

Modified polyphenylene ether ("MPPE") resins are a well known class of thermoplastic resins which combine relatively high impact, excellent thermal stability, low water absorption and a low degree of flammability. These resins are produced by alloying polyphenylene ether polymers with alkenyl aromatic resins such as impact polystyrene. The terms "modified polyphenylene ether" and "MPPE" are used herein to refer broadly to all of these alloyed resins.

Even though modification with polystyrene does increase ease of molding of unmodified polyphenylene ethers, such MPPE resins often exhibit far from ideal flow properties. Thus further flow modification is usually required to provide resins that are readily moldable at moderate temperatures.

Although unmodified polyphenylene ethers exhibit substantial inherent flame resistance, modification with impact polystyrene significantly increases their flammability. Since MPPE resins find increasing application in electrical and electronic equipment and appliances, a high level of flame retardancy is usually required.

Aromatic phosphate esters have been used for some time to increase the flame retardancy of MPPE resins. As noted in U.S. Pat. No. 4,579,901, Table 1, when sufficient amounts of the esters are added to provide a good degree of flame retardancy, the compositions are also plasticized, resulting in improved melt flow behavior. However, such compositions also exhibit a serious loss of heat resistance, a marked disadvantage. Another problem is that some of the volatile fluid phosphate esters often migrate to the surface during molding, accumulating as droplets near the molding vents. This effect, known in the trade as "juicing," is not only objectionable from an appearance standpoint, but it may also result in stress cracking. The plastic part as molded may be under stress and the accumulated liquid phosphate ester can induce cracking. For example, see U.S. Pat. No. 4,503,178, column 1, line 65, to column 2, line 11.

Underwood, et al. U.S. Pat. No. 3,850,882 disclose a three component flame retardant additive system for polyolefins, especially polypropylene, consisting of (a) among other halogenated aromatic compounds, a halogenated alkyl benzene of the formula

where X may be Cl or Br; and Y is a hydrocarbon of 1–20 carbon atoms; a is an integer from 0 to 3; and n is an integer from 3 to 6.

(b) stannic oxide;

(c) a bis-phenylalkylene hydrocarbon.

The patent does not suggest that such a flame retardant mixture has any utlity in MPPE resins, let alone that the halogenated alkylbenzene would have any such use.

Rueter, et al. U.S. Pat. No. 4,129,551 discloses non-flammable polyester compositions incorporating a phosphorus-containing, multiple component flame retardant additive consisting of:

(a) a triarylphosphine oxide or an aryl or alkyl ester of an arylphosphinic acid;

(b) a nuclear brominated alkylbenzene; and (c) customary auxiliary agents and additives.

Polyester compositions based on such agents contain 0.5–10% by weight of bromine and 0.1–2% by weight of phosphorus. Among the nuclear brominated alkylbenzenes described were a compound of the following formula:

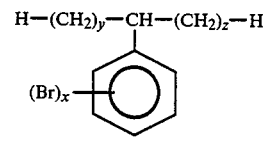

where $x=2$ to 5, y and z each are zero or an integer from 1 to 17 and sum of $y+z$ is an integer between 7 and 17.

Mixtures of such agents are also suggested. There is no disclosure that the additive mixture has any utility in MPPE resins or that the nuclear brominated alkylbenzene may be so-used alone for that or any other purpose.

Therefore, it is a principal object of this invention to provide modified polyphenylene ether compositions having flame retardancy and improved flow properties during molding.

Another objective of this invention is to provide modified polyphenylene ether resin compositions incorporating a superior flame retardant agent.

Yet a further object is to utilize polybrominated higher alkylbenzenes as flame retardant melt flow modifiers for MPPE resin compositions.

Another object of this invention is to provide such flame retardant compositions which have reduced amounts of the flow enhancer that accumulates on the surface of molded parts.

SUMMARY OF THE INVENTION

The foregoing and other objects, advantages, and features of the subject invention may be obtained with a flame retarded modified polyphenylene ether resin composition based on a polyphenylene ether homo- or co-polymer incorporating a polybrominated higher alkylbenzene flame retardant flow modifier. The modified polyphenylene ether resin incorporates effective amounts of a polybrominated higher ($C_{6-18}$) mono- or di-alkylbenzene and an enhancing agent.

Preferably, the polybrominated alkylbenzenes utilized in accordance with this invention include tetra- and penta-bromo secondary and tertiary alkyl benzenes, wherein the alkyl group contains 6–18 carbon atoms, and tri- and tetra-bromo secondary and tertiary dialkylbenzenes, wherein the alkyl groups contain 6–18 carbon atoms.

The compositions of this invention preferably comprise about 50 to 90 percent MPPE thermoplastic resin, about 5 to 25 percent polybrominated higher alkylbenzene, and about 1 to 15 percent enhancing agent, all by weight of the composition.

DETAILED DESCRIPTION OF THE PREFERRED EMBODIMENTS

In accordance with this invention, it has been discovered that polybrominated higher alkylbenzenes may be used as a flame retardant flow modifier for MPPE resin formulation. The term "higher," as used herein with respect to polybrominated higher alkylbenzenes is intended to include secondary and tertiary alkylbenzenes and mixtures thereof.

More particularly, polybrominated higher alkylbenzenes are useful in the preparation of flame retardant and flow modified thermoplastic MPPE resins in accordance with procedures known in the art. The novel compositions of this invention are distinguished from known flame retardant MPPE compositions by improved properties.

Preferred novel flame retardant MPPE compositions may be prepared by admixing from about 50% to about 90% by weight thermoplastic MPPE resin; from about 5% to about 25% by weight polybrominated higher alkylbenzene; and 1% to about 15% enhancing agent, where the percentages are based on the total weight of the resulting admixture of these three components. Preferably, the compositions comprise about 50 to 80% MPPE, about 5 to 20% by weight polybrominated alkylbenzene and about 1 to 5% enhancing agent.

MPPE resins include the various homo- and co-polymer polyphenylene polymers. Commercially available MPPE samples include "NORYL" resins of General Electric Co. and "PREVEX" resins of Borg-Warner Co.

The polybrominated higher alkyl benzene flame retardant additives utilized in accordance with the present invention are nuclear halogenated aromatic compounds of the generalized structures (I) and (II):

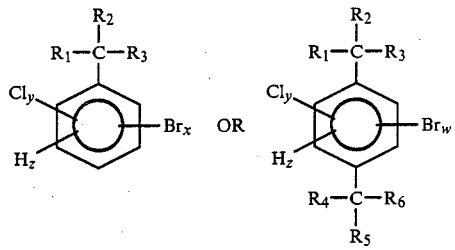

wherein x is 4 or 5, y is zero or 1, z is zero or 1, w is 2 to 4, $R_1$ and $R_4$ are hydrogen or methyl, and $R_2$, $R_3$, $R_5$, $R_6$ are alkyl ranging independently from 1 to 16 carbon atoms. Also, numerically combining $R_1$, $R_2$ and $R_3$ or $R_4$, $R_5$ and $R_6$, the total number of carbon atoms ranges from 5 to 17. Mixtures of such compounds may be produced and are especially preferred.

Compounds of structure (I) are tetra- and penta-halo secondary or tertiary alkylbenzenes, wherein the alkyl group is of 6 to 18 carbon atoms. Compounds of structure (II) are tri- and tetra-halo secondary or tertiary dialkylbenzenes wherein the alkyl group has 6 to 18 carbon atoms.

Preferred compounds produced in accordance with this invention are secondary and tertiary decyl, undecyl, dodecyl, tridecyl and tetradecyl benzenes containing 4 to 5 bromines on the benzene nucleus. In place of individual compounds, it is especially preferred to employ mixtures of such compounds. In general, pure brominated primary alkylbenzenes are solids. However, mixtures of brominated secondary and tertiary alkylbenzenes are liquids having a broader range of uses due to their liquid state. The polybrominated, predominantly secondary and tertiary, alkyl- and dialkyl-benzenes secondary alkylbenzenes produced in accordance with this invention generally have a bromine content between 30% and 70% and a chlorine content between 0% and 10%, by weight.

The polybrominated alkyl benzenes of this invention are produced by the direct bromination of the corresponding unbrominated material using an excess of liquid bromine as the reaction medium, using bromine chloride as the brominating agent, and using an antimony halide catalysts described in Favstritsky, et al. copending U.S. Patent Application entitled "Process for Producing Polybrominated Higher Alkylbenzenes", filed herewith.

As noted above, it is preferred to utilize mixtures of individual polybrominated benzenes in accordance with this invention, and these mixtures may be derived from mixtures of the corresponding alkyl benzenes. The mixtures of individual polybrominated alkyl benzenes that are most preferred are so-preferred for the additional reason that the corresponding hydrocarbon mixtures are readily available intermediates in the detergent industry.

Especially preferred polybrominated alkylbenzenes in accordance with this invention are the tetra- and penta-bromo derivatives of secondary, straight chain alkylbenzenes of the structure(III):

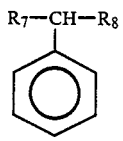

(III)

where $R_7$ and $R_8$ are independently linear alkyl groups containing 1 to 12 carbon atoms and where, when numerically combined, $R_7$ and $R_8$ contain between 9 and 13 carbon atoms, primarily 9 and 11 carbon atoms and where $R_7$ is about 25 to 35% methyl. Such a secondary, straight chain alkylbenzene is commercially available from Monsanto Co. under the trademark "DODANE S," which is a mixture of secondary monoalkylbenzenes, wherein the alkyl is primarily undecyl and dodecyl.

Another preferred polybrominated alkylbenzene is derived from a secondary, straight chain alkylbenzene of formula (III), wherein the numerical combination of $R_7$ and $R_8$ is between 9 and 11 carbon atoms and where $R_7$ is about 10 to 15% methyl. Such a preferred alkylbenzene is commercially available from Monsanto Co. under the trademark "ALKYLATE 215, " which is a mixture of secondary monoalkylbenzenes similar to "DODANE S."

Still anothr preferred polybrominated alkyl benzene is derived from a tertiary, branched chain alkylbenzene of the formula (IV):

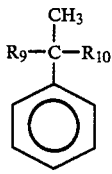

(IV)

where $R_9$ and $R_{10}$ are independently alkyl groups containing 1 to 9 carbon atoms and where the numerical combination of $R_9$ and $R_{10}$ is primarily 8 to 11 carbon atoms. Such a tertiary alkyl benzene, in which $R_9$ and $R_{10}$ are typically nonlinear alkyl groups, is commercially available from Monsanto Co. under the trademark "DODANE H," which is a mixture of tertiary branched chain, monoalkylbenzenes, wherein alkyl is primarily dodecyl.

Still another preferred polybrominated alkylbenzene is derived from a secondary, straight chain dialkylbenzene of the formula (V)

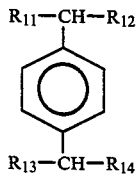

(V)

where $R_{11}$, $R_{12}$, $R_{13}$, and $R_{14}$ are independently linear alkyl groups containing 1 to 10 carbon atoms and where, when numerically combined, $R_{11}$ and $R_{12}$ or $R_{13}$ and $R_{14}$ contain primarily 11 carbon atoms. Such a material, in which para substitution predominates and which contains up to 10% monoalkylbenzenes, is commercially available from Pilot Chemical Co. under the trademark "ARISTOL E," which is a mixture of secondary dialkyl benzenes wherein alkyl is primarily do-
decyl. Other commercially available alkylbenzenes may of course also be brominated and then employed in accordance with the present invention.

The brominated alkylbenzenes of the present invention are high boiling liquids, nonvolatile, thermally stable, hydrolytically stable and flame resistant. They may be incorporated in MPPE compositions of this invention during formulation as is known to those skilled in the art. Typical compounding techniques involve melt blending of components in a high efficiency mixer such as a twin screw extruder. For the experimental work described herin, it was found advantageous to first make a concentrate of MPPE resin and the polybrominated alkyl benzene in a Prep-Center bowl and then make the final let-down in a single screw extruder.

The compositions of this invention alos desirably incorporate one or more enhancing agents. Enhancing agents useful in accordance with this invention comprise the oxides and halides of groups IV-A and V-A of the periodic table; organic or inorganic compounds of phosphorous, nitrogen, boron, or sulfur; and oxides and halides of, for examle, zinc, magnesium and titanium, all as disclosed in U.S. Pat. No. 4,016,139. Preferred enhancing agents in accordance with this invention are the oxides of antimony, arsenic and bismuth, with the oxides of antimony being especially preferred. Antimony trioxide is the most preferred enhancing agent used in the compositions of this invention. As noted, the enhancing agent is supplied at the level of about 1–15 percent by weight. Preferably, the enhancing agent is used at a level of about 1–5 percent by weight.

The scope of the present invention includes the incorporation of other additives in the composition so far as to affect a particular end result. Such additives include, without limitation, heat stabilizers, light stabilizers, plasticizers, other flame retardants, pigments/preservatives, ultraviolet stabilizers, fillers, antioxidants, antistatic agents, and other materials well known to those skilled in the art, for example, as described in Modern Plastic Encyclopedia, Vol. 63, No. IOA, McGraw-Hill, Inc. (1986).

The above described other additive materials which may be employed in the composition of this invention can be utilized in any amounts which will not substantially adversely affect the properties of the composition. In general, such amount will be from about 0% to about 80%, based on the total weight of the composition.

EXAMPLES

The following preparations and examples are given to illustrate the invention and should not be construed as limiting its scope. All parts are given by weight unless otherwise indicated.

A polybrominated higher alkylbenzene, specifically polybrominated DODANE S, was prepared by the procedure described in copending Favstritsky, et al. U.S. Patent Application entitled "Process for Producing Polybrominated Higher Alkylbenzenes," filed herewith. The polybrominated DODANE S contained 60.6 percent bromine, had a viscosity of 625 cps and the thermal properties given in the following Table I.

TABLE I

| Polybrominated DODANE S | |
|---|---|
| Br, % | 60.6 |
| Viscosity, cps | 625 |
| TGA, °C. | |
| 1% weight loss | 221 |

TABLE I-continued

| Polybrominated DODANE S | |
|---|---|
| 5% weight loss | 260 |

Example 1

Into a Prep-Center mixing bowl, held at 250° C., were combined 175 g of modified polyphenylene ether resin (NORYL 731 available from General Electric Co.) and 175 g of brominated alkylbenzene, described in Table I. The mixture was fluxed for three minutes at 60 RPM, the resulting blend discharged from the mixer and then granulated. Several identical batches were made and combined. The resulting concentrate was let down by combining and charging to a 1.75 inch single-stage extruder with all zones held at 270° C., a mixture of 1120 g of MPPE resin, 80 g of antimony oxide and 800 g of the concentrate. The extrudate was then granulated.

Example 2

Example 2 illustrates the use of the materials of the invention along with a co-flame retardant. Again using the procedure and the concentrate of Example 1, the extruder was charged with a mixture of 1720 g of MPPE resin, 60 g of a brominated polystyrene, 20 g of antimony trioxide and 200 g of the concentrate. The extrudate was then granulated.

The granulated product from Examples 1 and 2 were injection molded into a number of standard ASTM test specimens and tested. The results are shown in Table II.

Comparative Example 3 (Control)

Granulated MPPE without any additive was injection molded into a number of standard ASTM test specimens and served as control.

TABLE II

| MPPE DATA | | | |
|---|---|---|---|
| | Example 1 | Example 2 | Control Example 3 |
| UL 94 Rating | V-O | V-O | Fail |
| Oxygen Index | 33 | 35 | 25 |
| Heat Distortion Temperature, °F. | 210 | 213 | 234 |
| Izod Impact, ft-lb/in | 3.8 | 3.8 | 4.4 |
| Tensile Strength, psi | 8,000 | 8,110 | 8,130 |
| Elongation, % | 23 | 21 | 28 |
| Flexural Strength, psi | 12,800 | 13,000 | 14,110 |
| Flexural Modulus, $10^5$ psi | 3.8 | 3.8 | 4.0 |
| Spiral Flow, in | 23 | 20 | 9 |

These data demonstrate that polybrominated higher alkylbenzenes are highly efficient flame retardants for MPPE compositions. In addition, these agents are good flow modifiers, and the physical properties and impact strength of flame retarded MPPE are not substantially changed by the use of the agents of this invention.

We claim:

1. A flame retardant modified polyphenylene ether resin composition comprising:
   a modified polyphenylene ether resin;
   as a flame retardant agent and flow modifier, an effective amount of a polybrominated higher alkylbenzene containing about 30–70 percent bromine by weight of the agent; and
   an enhancing agent.

2. A composition, as claimed in claim 1, wherein the polybrominated higher alkylbenzene is a compound of the structure:

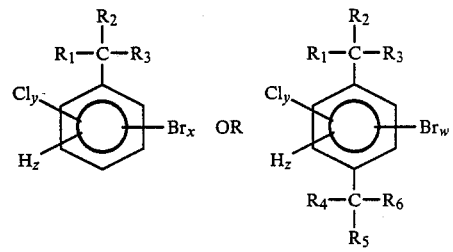

wherein x is 4 or 5, y is zero or 1, z is zero or 1, w is 2 to 4; where $R_1$ and $R_4$ are hydrogen or methyl, and $R_2$, $R_3$, $R_5$, $R_6$ are alkyl groups ranging independently from 1 to 16 carbon atoms and where the total number of carbon atoms in each of ($R_1$, $R_2$ and $R_3$) and ($R_4$, $R_5$ and $R_6$) ranges from 5 to 17.

3. A composition, as claimed in claim 2, wherein the polybrominated higher alkylbenzene is a tetra- or penta-bromo secondary $C_{6-18}$ alkylbenzene.

4. A composition, as claimed in claim 1, wherein the composition comprises about 50 to 90 percent modified polyphenylene ether resin, about 5 to 25 percent polybrominated higher alkylbenzene, and about 1 to 15 percent enhancing agent, all by weight of the flame retardant modified polyphenylene ether resin composition.

5. A composition, as claimed in claims 3 or 4, wherein the alkyl groups are a mixture of $C_{10-12}$ alkyl groups.

6. A composition, as claimed in claims 3 or 4, wherein the the polybrominated alkylbenzene is a liquid mixture of $C_{10-12}$ tetra- and penta-bromoalkylbenzenes.

7. A composition, as claimed in claim 1, wherein the composition comprises about 50 to 90 percent MPPE resin, about 5 to 25 percent polybrominated higher alkylbenzene, and about 1 to 15 percent enhancing agent, all by weight of the flame retardant MPPE composition.

8. A composition, as claimed in claim 1, wherein the enhancing agent is antimony oxide.

* * * * *

UNITED STATES PATENT AND TRADEMARK OFFICE
CERTIFICATE OF CORRECTION

PATENT NO. : 4,831,072

DATED : May 16, 1989

INVENTOR(S) : Nicolai A. Favstrisky, Robert J. Nulph
and Dennis M. Borden

It is certified that error appears in the above-identified patent and that said Letters Patent is hereby corrected as shown below:

Column 1, line 28 "known" should be -- "know" --
Column 1, line 30 "through" should be -- "though" --
Column 5, line 27 "anothr" should be -- "another" --
Column 6, line 16 "alos" should be -- "also" --
Column 6, line 22 "examle" should be -- "example" --

IN THE CLAIMS:

In Claim 4, Column 8, lines 37-42 should be deleted and the following should be inserted:

-- 4. A composition, as claimed in Claim 2, wherein the polybrominated higher alkylbenzene is a tri-or tetra-bromo secondary or tertiary di-$C_{6-18}$- alkylbenzene. --

In Claim 7, Column 8, line 49, "MPPE" should be
-- modified polyphenylene ether --
In Claim 7, Column 8, line 52, "MPPE" should be
-- modified polyphenylene ether resin --

Signed and Sealed this

Twenty-fourth Day of April, 1990

Attest:

HARRY F. MANBECK, JR.

Attesting Officer     Commissioner of Patents and Trademarks